United States Patent [19]
Goodwin, III

[11] Patent Number: 6,044,358
[45] Date of Patent: Mar. 28, 2000

[54] SYSTEM AND METHOD OF DETERMINING PRICE DIFFERENCES BETWEEN PRICE LOOK-UP FILES

[75] Inventor: John C. Goodwin, III, Suwanee, Ga.

[73] Assignee: NCR Corporation, Dayton, Ohio

[21] Appl. No.: 08/879,735

[22] Filed: Jun. 20, 1997

[51] Int. Cl.$^7$ .................................................. G06F 17/60
[52] U.S. Cl. .............................................. 705/20; 705/21
[58] Field of Search ........................ 705/20, 21; 235/383

[56] References Cited

U.S. PATENT DOCUMENTS

| | | | |
|---|---|---|---|
| 4,002,886 | 1/1977 | Sundelin | 235/61.7 R |
| 4,500,880 | 2/1985 | Gomersall et al. | 340/825.35 |
| 4,924,363 | 5/1990 | Kornelson | 362/125 |
| 5,072,381 | 12/1991 | Richardson et al. | 364/410 |
| 5,172,314 | 12/1992 | Poland et al. | 364/401 |
| 5,198,644 | 3/1993 | Pfeiffer et al. | 235/383 |
| 5,260,936 | 11/1993 | Bardet et al. | 370/61 |
| 5,448,226 | 9/1995 | Failing, Jr. et al. | 340/825.35 |
| 5,461,561 | 10/1995 | Ackerman et al. | 364/401 |
| 5,493,107 | 2/1996 | Gupta et al. | 235/383 |
| 5,526,267 | 6/1996 | Sogawa | 364/431.11 |
| 5,537,126 | 7/1996 | Kayser et al. | 345/1 |
| 5,539,393 | 7/1996 | Barfod | 340/825.52 |
| 5,572,653 | 11/1996 | DeTemple et al. | 345/501 |
| 5,684,990 | 11/1997 | Boothby | 707/203 |
| 5,729,696 | 3/1998 | Goodwin, III et al. | 705/22 |
| 5,812,985 | 9/1998 | Failing et al. | 705/5 |
| 5,870,714 | 2/1999 | Shetty et al. | 705/20 |

OTHER PUBLICATIONS

2–Way Radio Eases Price Maintenance (O'Neill, R., Progressive Grocer, vol. 62, p. 95), Nov. 1983.

*Primary Examiner*—Allen R. MacDonald
*Assistant Examiner*—Alexander Kalinowski
*Attorney, Agent, or Firm*—Paul W. Martin; Peter H. Priest

[57] ABSTRACT

A system and method of determining price differences between price files which minimizes the possibility that an incorrect price is displayed by an electronic price label (EPL). The system includes a computer which reads the first and second price files, compares the prices for the items in the first and second files, and identifies predetermined items having different prices in the first and second files. The computer is preferably an EPL computer. Once a price discrepancy is identified, it may be logged and acted upon in accordance with rules established by an operator.

12 Claims, 6 Drawing Sheets

SYSTEM AND METHOD OF DETERMINING PRICE DIFFERENCES BETWEEN PRICE LOOK-UP FILES

CROSS-REFERENCE TO RELATED APPLICATIONS

The present application is related to co-pending application Ser. No. 08/539,449, filed Oct. 5, 1995, entitled "SYSTEM AND METHOD OF OBTAINING INFORMATION FROM A PRICE LOOK-UP FILE", and having as inventor, John Goodwin.

BACKGROUND OF THE INVENTION

The present invention relates to electronic price label (EPL) systems, and more specifically to a system and method of determining price differences between price look-up (PLU) files.

In a traditional retail store, bar code scanners rely on price information maintained within a PLU file. The PLU file is typically stored in a single location at host server. However, some stores have an In-Store Processor (ISP) and one or more point-of-sale (POS) servers. In most cases, the ISP's PLU file is the primary PLU file. The POS server obtains its PLU information from the ISP's PLU file and the checkout terminals obtain PLU information from the POS server's PLU file.

EPL systems typically include a plurality of EPLs for each merchandise item in a store. EPLs display the price of corresponding merchandise items on store shelves and are typically attached to a rail along the leading edge of the shelves. EPL systems typically obtain their prices from the POS server's PLU file. A store may contain thousands of EPLs to display the prices of the merchandise items. The EPLs are coupled to a central server from where information about the EPLs is typically maintained in an EPL data file. The EPL data file contains EPL identification information, and EPL merchandise item information.

Price mismatch can occur in EPL systems that obtain price information from a duplicate PLU file. The POS server's PLU file often becomes out of synchronization with the ISP's PLU file. Lack of synchronization may lead to an EPL displaying a wrong price. Therefore, it would be desirable to provide a system and method of determining price differences between an ISP's PLU file and a POS server's PLU file.

SUMMARY OF THE INVENTION

In accordance with the teachings of the present invention, a system and method of determining price differences between price look-up (PLU) files is provided.

The system includes a computer which reads the first and second price files, compares the prices for the items in the first and second files, and identifies predetermined items having different prices in the first and second files. The computer is preferably an electronic price label (EPL) computer associated with an EPL system which relies on the accuracy of the prices in the first and/or second price files to display its prices.

A method of identifying an incorrect price displayed by electronic price labels includes the steps of reading a first price file containing first prices of items displayed by the EPLs, reading a second price file containing second prices of the items, comparing the first and second prices, and identifying predetermined items having different prices in the first and second files.

Once a price discrepancy is identified, it may be logged and acted upon in accordance with rules established by an operator.

It is accordingly an object of the present invention to provide a system and method of determining price differences between price files.

It is another object of the present invention to provide a system and method of determining price differences between price files which minimizes the possibility that an incorrect price is displayed by an electronic price label (EPL).

It is another object of the present invention to provide a system and method of synchronizing a plurality of price files which provide price information to both a POS system and an EPL system.

It is another object of the present invention to provide a system and method of determining price differences between price files, in which an EPL computer executes PLU file reader programs having standard APIs and/or service layers for reading the price files.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1A:
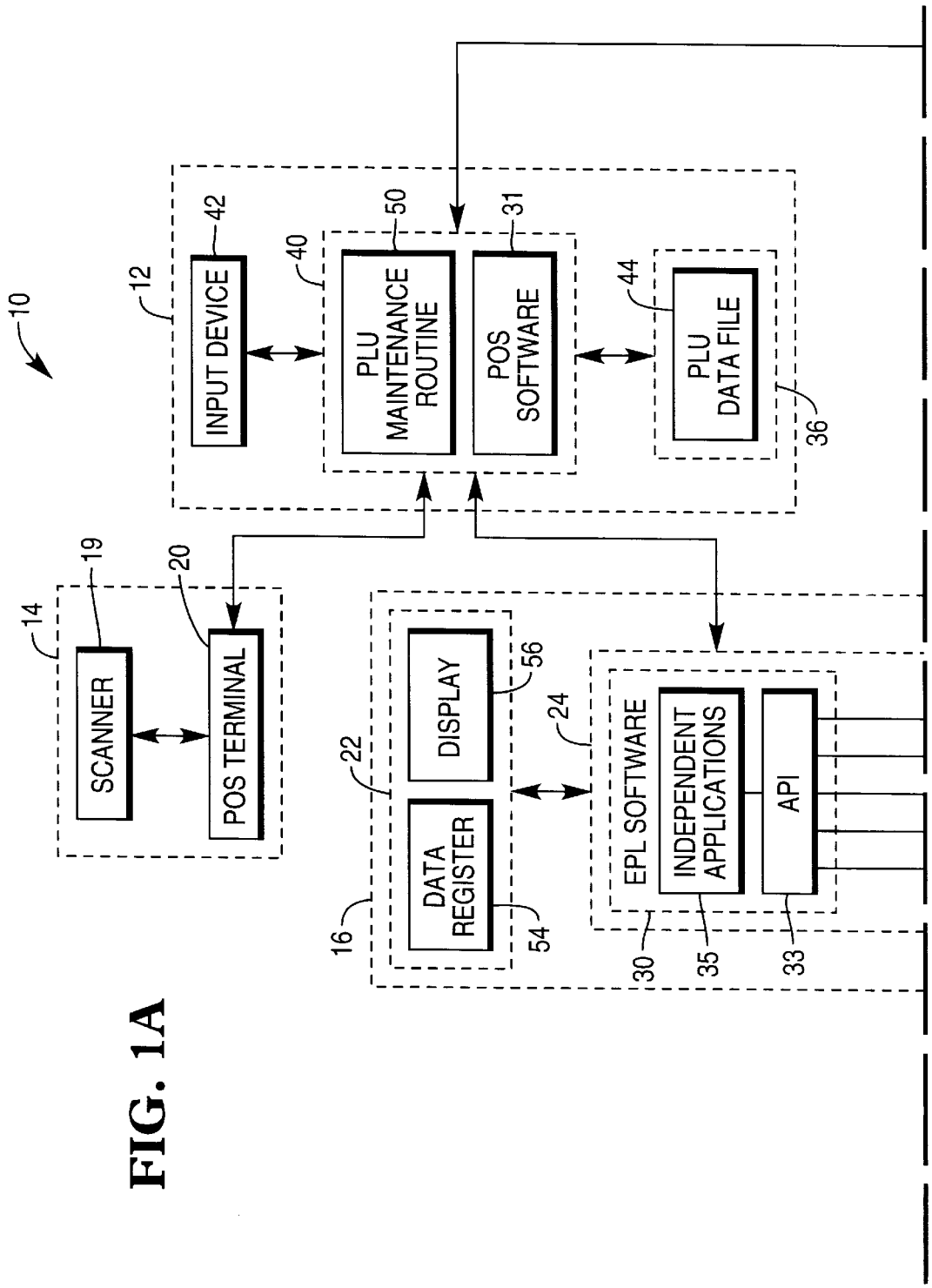
FIGS. 1A and 1B form a block diagram of a transaction management system.
Figure 1B:
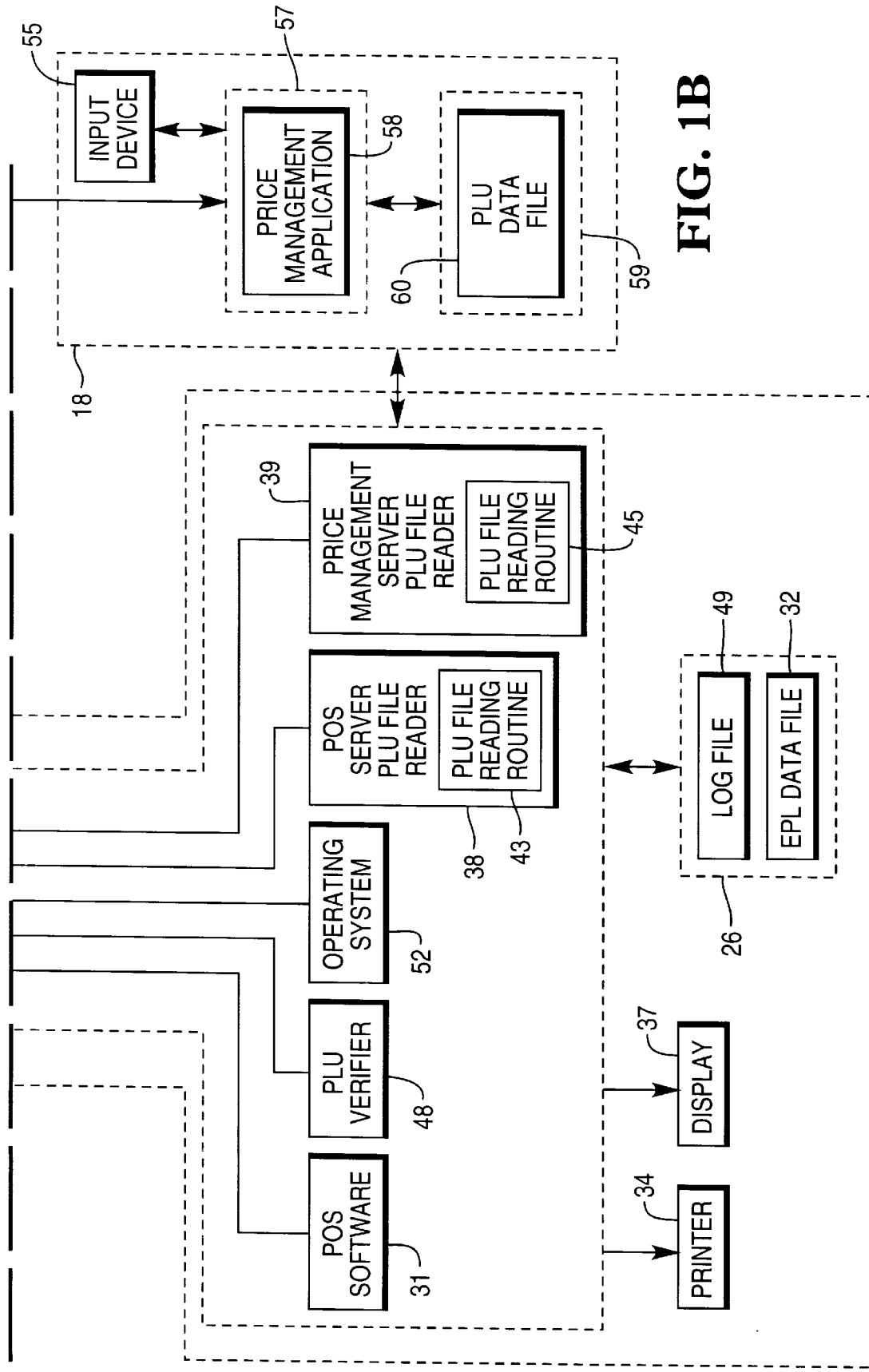

Referring now to FIGS. 1A and 1B, transaction system 10 preferably includes POS computer system 12, checkout system 14, EPL system 16, and ISP computer system 18.

POS computer system 12 preferably includes bar code scanner 19 and terminal 20.

EPL system 16 preferably includes EPLs 22, host EPL terminal 24, and EPL storage medium 26.

EPLs 22 are typically attached to shelves within a store and include a data register 54 and a display 56. Data registers 54 contain data, usually the price of an item associated with an EPL on the shelves. The data is typically displayed by display 56.

Host EPL terminal 24 executes EPL software 30, which maintains the contents of EPL data file 32. EPL software 30 includes application programming interface (API) 33, which has hooks to operating system 52 or POS software 31. For example, a commercially-available API exists for the UNIX and OS/2 operating systems of Novell and IBM, and the UNITY POS software of NCR Corporation. EPL software 30 includes a suit of independent applications 35 which all have hooks to API 33.

Host EPL terminal 24 also executes POS server PLU file reader 38, ISP server PLU file reader 39, and PLU verifier application 48, all of which are compiled to run on operating system 52 or on POS software 31, depending on the needs of the transaction establishment. POS server PLU file reader 38 directly accesses PLU information in PLU data file 44 residing in POS computer system 12. ISP server PLU file reader 39 directly accesses PLU information in PLU data file 60 residing in ISP computer system 19. The PLU information is preferably item identification and price information.

POS server PLU file reader 38 is linked to API 33 through inter-process communications and includes PLU file reading routine 43 which works with API 33 to cause POS software 31 or operating system 52 to read PLU data file 44 and transfer PLU information to PLU verifier 48. PLU file reading routine 43 also works with API 33 to cause POS software 31 or operating system 52 to send PLU information to electronic price label (EPL) software 30 so that it can manage the prices displayed by EPLs 22.

ISP server PLU file reader 39 is also linked to API 33 through inter-process communications and includes PLU file reading routine 45 which works with API 33 to cause POS software 31 or operating system 52 to read PLU data file 60 and transfer PLU information to PLU verifier 48.

Advantageously, none of the other applications 35 have to change if PLU file readers 38 and 39 are created and placed into system 10. As PLU reader 38 attaches into API 33 via interprocess communications, it isolates independent application programs 35 from the details of PLU maintenance routine 50 and PLU data file 44. PLU reader 38 masks price information in PLU data file 44 into displayable formats for EPL system 16. In many EPL systems, data format 9/9.99 (9 for 9.99) or 99.99 is the maximum price display. As further examples, data format 2/12.40 masks into displayable information 6.20 and data format 10/1.10 masks into displayable information 0.11.

This method proves advantageous in handling advanced pricing methods. For example, one customer may wish to display price information for a "buy one get one free" item differently than price information for another item. PLU reader 38 performs this change a single time and independent applications do not require modification because of this change.

Similarly, as PLU reader 39 attaches into API 33 via interprocess communications, it isolates independent application programs 35 from the details of price management application 58 and PLU data file 60.

EPL storage medium 26 stores EPL data file 32 and log file 49 and is preferably a fixed disk drive.

POS computer system 12 includes PLU storage medium 36, host PLU terminal 40, and input device 42.

PLU storage medium 36 stores PLU data file 44. PLU file 44 contains price information which is available for distribution to POS terminal 20 by host PLU terminal 40. Provision may also be made for bar code scanner 19 to directly access PLU file 44 from host PLU terminal 40.

Host PLU terminal 40 executes POS software 31 and PLU maintenance routine 50. PLU maintenance routine 50 is controlled by POS software 31 and updates PLU file 44, prepares system 12 for a loss of PLU data file 44, and executes PLU data recovery procedures.

Input device 42 is preferably a keyboard. Input device 42 makes changes to PLU data file 44, including price changes that may be required following execution of PLU verifier 48.

PLU maintenance routine 50 may send changes in price in PLU file 44 directly to EPL terminal 24 and POS terminal 20 as they are entered in input device 42 (immediate processing) or store price changes within a batch file for later batch updating (batch processing).

ISP computer system 18 includes PLU storage medium 59, price management server 57, and input device 55.

PLU storage medium 59 stores PLU data file 60. PLU data file 60 contains price information which is available for distribution to one or more POS computer systems 12. PLU data file 60 is the primary PLU file in system 10. Changes to PLU data file 60 are sent to all of the POS computer systems 12 within system 10.

Price management server 57 executes price management application 58 which updates PLU file 60 and disseminates changes in PLU data file 60 to all POS computer systems 12 with system 10.

Input device 55 is preferably a keyboard. Input device 55 makes changes to PLU data file 60, including price changes that may be required following execution of PLU verifier 48.

Price management application 58 may send changes in price in PLU file 60 directly to POS server 40 as they are entered in input device 55 (immediate processing) or store price changes within a batch file for later batch updating (batch processing).

During normal operation, EPL terminal 24 executes POS server PLU file reader 38 to obtain price information from PLU data file 44. EPL software 30 sends the price information to data register 54. Display 56 displays the price in data register 54.

EPL terminal 24 also executes price management server PLU file reader 39 and PLU verifier 48. Price management server PLU file reader 39 reads price information from PLU data file 60.

PLU verifier 48 compares PLU data file 44 with PLU data file 60 to determine items that do not have the same price in both files 44 and 60. PLU verifier 48 stores the items and the prices in both files 44 and 60 in log file 49. Log file 49 may be viewed using display 37 or printed using printer 34.

Here, terminals 20, 24, and 40 are shown as separate components that are networked together, but they may also be combined in different ways. For example, EPL terminal 24 and host PLU terminal 40 may be combined to form a single host computer. POS terminal 20 and host PLU terminal 40 may be combined to form a POS terminal which doubles as a host computer for a network of other POS terminals.

Figure 2:
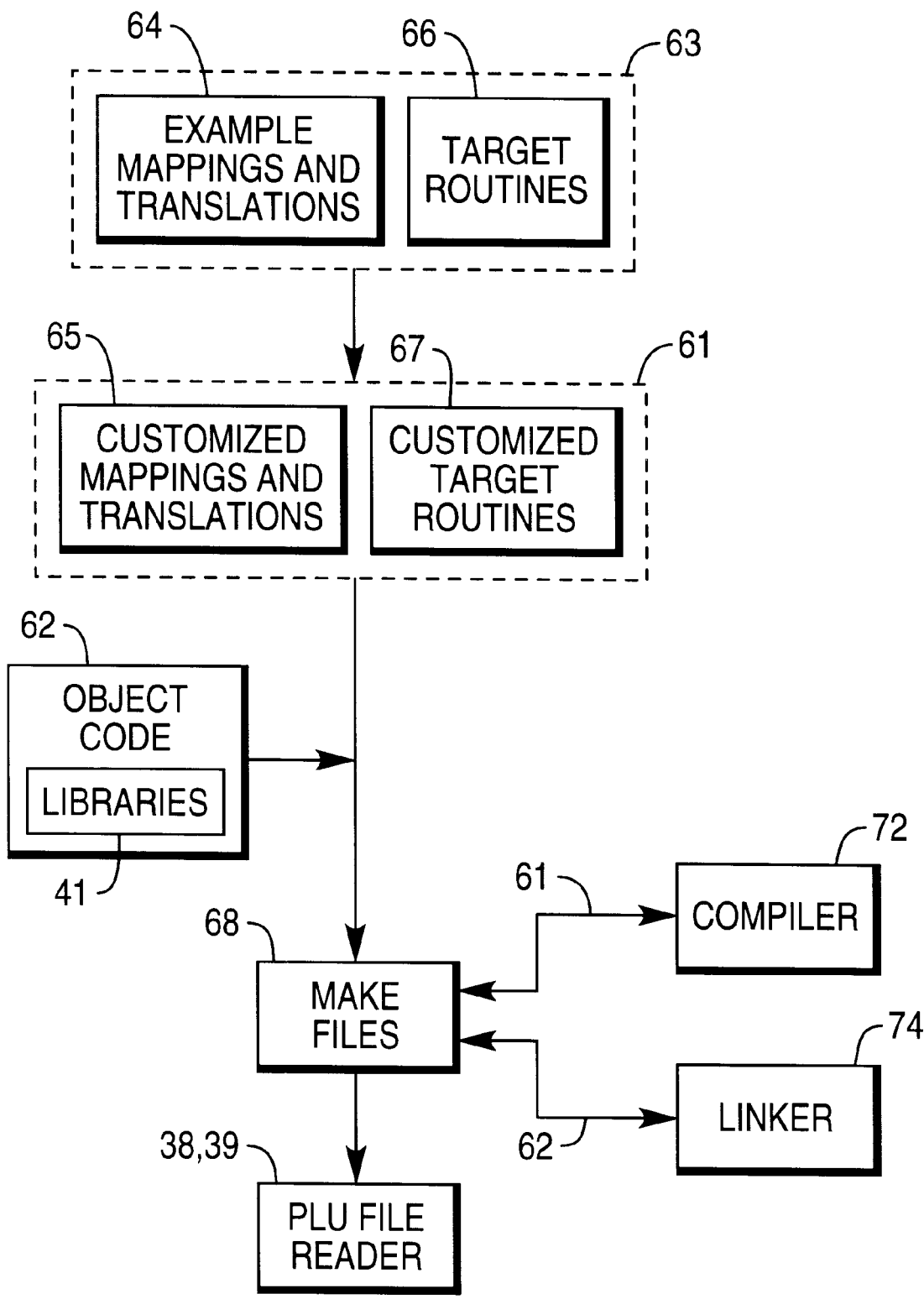
FIG. 2 is a block diagram of a system for producing a PLU file reader program.

Turning now to FIG. 2, the components that are used to construct POS server PLU file reader 38 and price management server PLU file reader 39 include template PLU file reader 63, object code 62, example mappings and translations 64, target routines 66, and make files 68. Template PLU reader 63 is a super set of example mappings and translations 64 and target routines 66. Example mappings and translations 64 and target routines 66 are edited and customized by developers to produce customized mappings and translations 65 and customized target routines 67 (customized template PLU 61). PLU file reading routines 43 and 45 are examples of customized target routines. Customized mappings and translations 65 and customized target routines 67 along with object code 62 are fed into make files 68 in order to produce executable code for POS server PLU file reader 38 and price management server PLU file reader 39.

Object code 62 consists of libraries 41 that provide an interface into API 33 and isolate all other EPL applications from API 33, thus allowing the existence of POS server PLU file reader 38 and price management server PLU file reader 39. Included in libraries 41 are functions to perform module start up, open a PLU data file, connect an application to a PLU data file, close an application's connection to a PLU data file, close a PLU data file, and to terminate the application.

Example mappings and translations 64 provide non-displayable information (in code and/or in documentation) and may be edited to customize POS server PLU file reader 38 and price management server PLU file reader 39.

Target routines 66 are routines that may be edited and customized to suit the needs of the target transaction establishment.

Make files 68 are files that pass source code (template 63) through compiler 72 and then pass object code 62 through linker 74 to produce the target executable.

Figure 3:
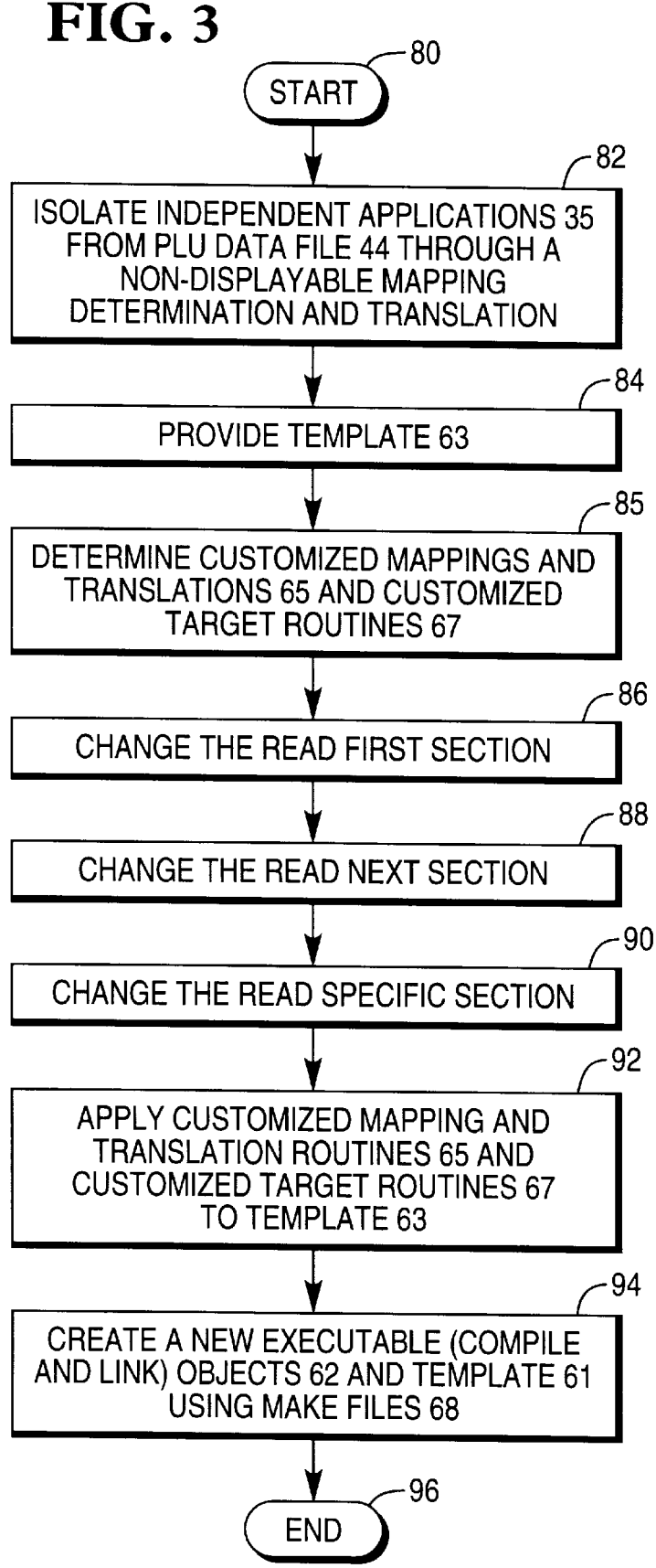
FIG. 3 is a flow diagram illustrating how the PLU file reader is created.

Turning now to FIG. 3, the method of creating generic POS server PLU file reader 38 and price management server PLU file reader 39 begins with START 80.

In step 82, independent applications 35 are isolated from a PLU data file (i.e., PLU data file 44 or PLU data file 60) through a non-displayable mapping determination and translation process. Example mappings and translations 64 result. This original development effort is provided to customers for future customization.

In steps 84, template 63 is provided. Template 63 is packaged in an installable format that can then be distributed and installed on the target system.

In step 85, customized mappings and translations 65 and customized target routines 67 are determined so that all information for an EPL can be displayed. Connection methods that will be employed for the target system are also determined.

In steps 86–92, customized template 61 is produced by changing template 63 to reflect customized mappings and translations 65. This work is performed by developers who are responsible for the integration of EPL system 16 for a target customer. Integration and customization are directed by the customer. This gives the customer the opportunity to gain a competitive advantage by displaying the information required to better serve its customers.

In step 86, the "read first" section is changed. The "read first" section is a routine that must be completed/customized to read the first price in the PLU data file.

In step 88, the "read next" section is changed. The "read next" section is a routine that must be completed/customized to read the next price in the PLU data file sequentially.

In step 90, the "read specific" section is changed. The "read specific" section is a routine that must be completed/customized to read a specific PLU data file record.

In step 92, customized mapping and translations 65 and customized target routines 67 derived from step 85 are applied to template 63.

In step 94, a new executable (POS server PLU file reader 38) is compiled and linked from object code 62 and template 61 using make files 68, compiler 72, and linker 74.

In step 96, the method ends.

Figure 4:
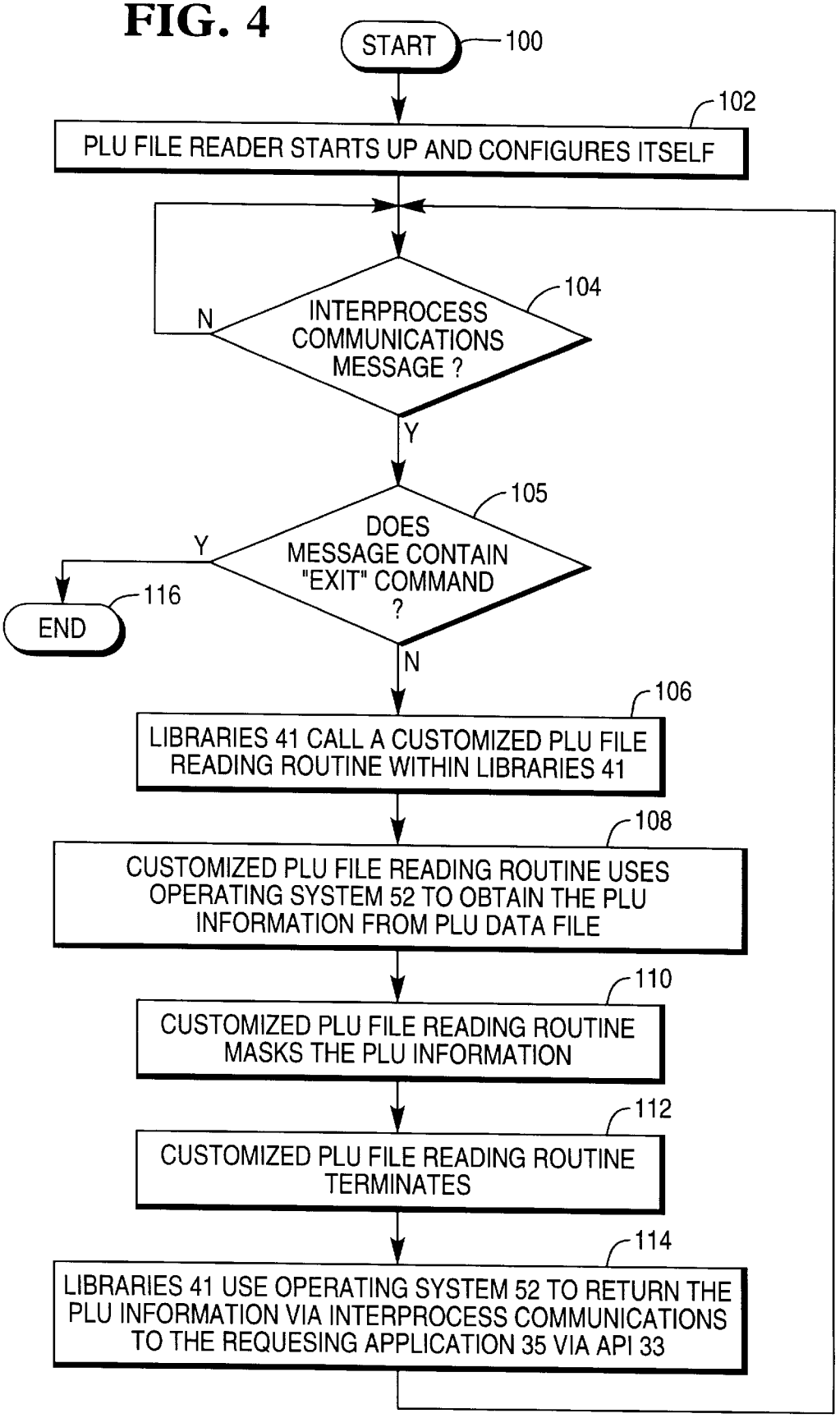
FIG. 4 is a flow diagram illustrating the operation of the PLU file reader program.

Referring now to FIG. 4, the operation of POS server PLU file reader 38 and price management server PLU file reader 39 are illustrated in detail, beginning with START 100.

In step 102, a PLU file reader (i.e., PLU file reader 38 or 39) starts up and configures itself.

In step 104, the PLU file reader waits for an interprocess communications message from API 33. Interprocess communication services (e.g., "queues" for UNIX, threads or pipes for OS/2) are provided by operating system 52. API 33 calls on operating system 52 to send a request from one of independent applications 35 to the PLU file reader. For example, this independent application 35 may be a price verifier application program that compares a price in PLU data file 44 with a price displayed by EPL 22. Independent application program 35 issues a call to API 33, instructing API 33 to perform a "read direct" routine provided by API 33. API 33 calls on operating system 52 to send the interprocess communications message to the PLU file reader. Preferably, API 33 passes the message to libraries 41 within the PLU file reader.

If such a message is received, the PLU file reader determines whether the interprocess communications message contains an "exit" command in step 105. If it does, the PLU file reader terminates in step 116.

If the interprocess communications message does not contain an "exit" command, libraries 41 call a PLU file reading routine (43 or 45) within libraries 41 in step 106. The PLU file reading routine is customized to the needs of the transaction establishment.

In step 108, the PLU file reading routine uses operating system 52 to obtain the PLU information from the PLU data file.

In step 110, the PLU file reading routine masks the PLU information from the PLU data file. For example, if application program 35 is a program which controls price information displayed by EPL 22, masking would include converting the PLU information into information that is displayable by EPL 22.

In step 112, the PLU file reading routine terminates.

In step 114, libraries 41 call on operating system 52 to return the PLU information via interprocess communications to the requesting application 35 via API 33. The PLU file reader returns to a waiting state in step 104.

After the PLU file reader sends the PLU information to API 33, API 33 passes the PLU information to the requesting application 35. Application program 35 can then display the information, compare the information, or otherwise examine the information in accordance with the function of application program 35.

Figure 5:
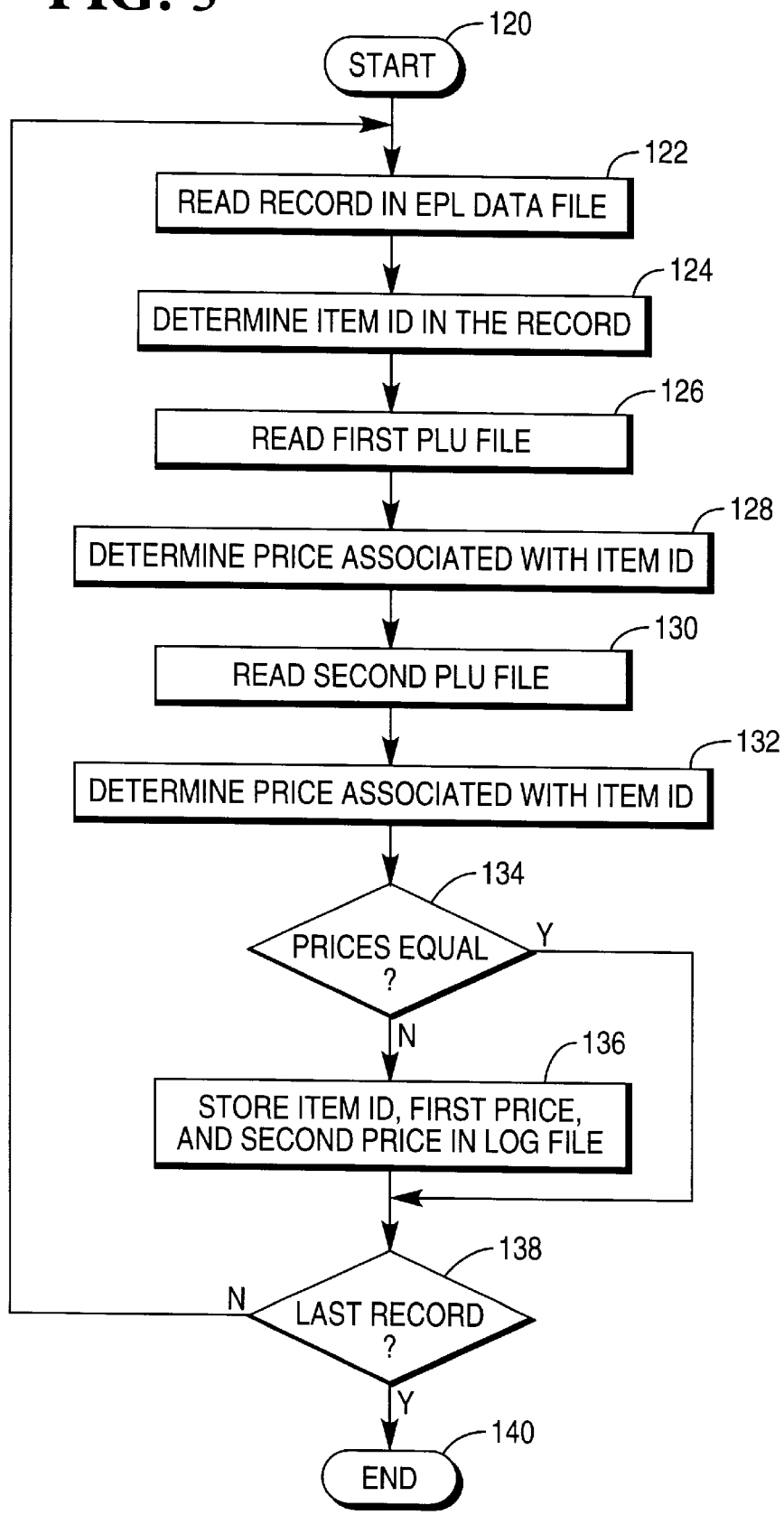
FIG. 5 is a flow diagram illustrating the method of the present invention.

Turning now to FIG. 5, the operation of PLU verifier 48 is explained in more detail beginning with START 120.

In step 122, PLU verifier 48 reads a record in EPL data file 32.

In step 124, PLU verifier 48 determines an item identification number in the record.

In step 126, PLU verifier 48 reads PLU data file 44.

In step 128, PLU verifier 48 determines a first price associated with the item identification number in PLU data file 44.

In step 130, PLU verifier 48 reads PLU data file 60.

In step 132, PLU verifier 48 determines a second price associated with the item identification number in PLU data file 60.

In step 134, PLU verifier 48 determines whether the first price equals the second price.

If not, PLU verifier 48 stores the item identification number, the first price, and the second price in log file 49 in step 136 and operation proceeds to step 138. If so, operation proceeds directly to step 138.

In step 138, PLU verifier 48 determines whether the record is the last record in EPL data file 32. If not, then operation returns to step 122 to read the next record. If so, then operation proceeds to step 140.

In step 140, operation ends.

An operator may display or print the contents of log file 49 and make necessary corrections to PLU data file 44 or 60, as determined by the needs of the retailer. A retailer may note a difference and do nothing, note the difference and update PLU data file 56, note the difference and update PLU data file 44. Additionally, the operator may set PLU verifier 48 to automatically update the contents of one of the PLU files 44 or 60 with the price in the other. After the PLU prices have been updated, EPL system 24 will update its displayed prices using its normal method.

Although the present invention has been described with particular reference to certain preferred embodiments thereof, variations and modifications of the present invention can be effected within the spirit and scope of the following claims.

What is claimed is:

1. A transaction management system comprising:

a first computer having a first file for storing prices for items;

a second computer having a second file for storing prices for the items; and a third computer which reads the first and second files, compares the prices for the items in the first and second files, identifies items having different prices in the first and second files, and provides a user with an option to:
   maintain the different prices in the first and second files;
   update the first price file with the second price; or
   update the second price file with the first price.

2. The system of claim 1 wherein the first computer is capable of transmitting the first file to the second computer and the second computer is capable of updating second file to be in synchronization with the first file.

3. The system of claim 1 further comprising a plurality of electronic price labels which display the prices of items stored within the first price file.

4. The system of claim 1 wherein the user is provided with the option to automatically update the first price file with all of the prices of the second price file.

5. The system of claim 1 wherein the user is provided with the option to automatically update the second price file with all of the prices of the first price file.

6. The system of claim 1 wherein each item is associated with an item identification number.

7. The system of claim 6 wherein each item identification number is a price look-up number.

8. An electronic price label (EPL) system in a transaction management system having first and second prices files comprising:

a plurality of EPLs which display prices of items stored within the first price file;

a computer which reads the first and second files, compares the prices for the items in the first and second files, identifies items having different prices in the first and second files and provides an option to:
   maintain the different prices in the first and second files;
   update the first price file with the second price; or
   update the second price file with the first price.

9. A method of identifying an inconsistent price displayed by electronic price labels (EPLs) comprising the steps of:

reading a first price file containing first prices of items displayed by the EPLs;

reading a second price file containing second prices of the items;

comparing the first and second prices;

identifying items having different prices in the first and second files; and providing an option to:
   maintain the different prices in the first and second files;
   update the first price file with the second price; or
   update the second price file with the first price.

10. A method of identifying an inconsistent price displayed by an electronic price label (EPL) comprising the steps of:

determining an item identification number for an item associated with the EPL;

reading a first price file containing a first price of the item displayed by the EPL;

reading a second price file containing a second price of the item;

comparing the first and second prices;

logging the item identification number, the first price, and the second price if the first and second prices are not equal; and providing an option to:
   maintain the inconsistent prices in the first and second files;
   update the first price file with the second price; or
   update the second price file with the first price.

11. A method of identifying an inconsistent price displayed by an electronic price label (EPL) comprising the steps of:

reading a record associated with the EPL;

determining an item identification number for an item associated with the EPL from the record;

reading a first price file containing a first price of the item displayed by the EPL;

reading a second price file containing a second price of the item;

comparing the first and second prices;

logging the item identification number, the first price, and the second price if the first and second prices are not equal; and providing an option to:
   maintain the inconsistent prices in the first and second files;
   update the first price file with the second price; or
   update the second price file with the first price.

12. A system of determining price differences between first and second price files comprising:

a computer which reads the first and second price files, compares the prices for items in the first and second files, identifies items having different prices in the first and second files, and provides an option to:
   maintain the inconsistent prices in the first and second files;
   update the first price file with the second price; or
   update the second price file with the first price;

wherein the computer is coupled to an electronic price label (EPL) which displays one of the first and second prices.

* * * * *